United States Patent
Cousins et al.

(10) Patent No.: US 10,857,679 B1
(45) Date of Patent: Dec. 8, 2020

(54) APPARATUS AND METHOD FOR AUXILIARY MOBILE ROBOT FUNCTIONALITY

(71) Applicant: Savioke, Inc., San Jose, CA (US)

(72) Inventors: Steve Cousins, San Jose, CA (US); Robert S. Bauer, Portola Valley, CA (US); Adrian Canoso, Sunnyvale, CA (US); Heather Klaubert, San Jose, CA (US)

(73) Assignee: Savioke, Inc., San Jose, CA (US)

(*) Notice: Subject to any disclaimer, the term of this patent is extended or adjusted under 35 U.S.C. 154(b) by 64 days.

(21) Appl. No.: 16/120,082

(22) Filed: Aug. 31, 2018

Related U.S. Application Data

(60) Provisional application No. 62/553,076, filed on Aug. 31, 2017.

(51) Int. Cl.
*G05B 19/18* (2006.01)
*B25J 11/00* (2006.01)
*B25J 9/16* (2006.01)

(52) U.S. Cl.
CPC ........... *B25J 11/008* (2013.01); *B25J 9/1666* (2013.01)

(58) Field of Classification Search
CPC combination set(s) only.
See application file for complete search history.

(56) References Cited

PUBLICATIONS

YouTube.com, "UBC Hackathon—PR2 Rides the Elevator", dated Jun. 10, 2012, https://youtu.be/6NPgToTOClw?t=98, 3 pages.
Github.com, "JSK Robot Demo Code—Elevator Push Button", https://github.com/jsk-ros-pkg/jsk_demos/blob/master/elevator_move_base_pr2/src/push-elevator-button.dated Dec. 28, 2015, 3 pages.

*Primary Examiner* — Bhavesh V Amin
(74) *Attorney, Agent, or Firm* — Hickman Palermo Becker Bingham LLP; Christine E. Orich

(57) ABSTRACT

A method for a robot to autonomously interact with elevator controls comprising: while physically traversing a route to a target location within an environment, determining that the route includes navigating to a particular floor that is different than a current floor of the robot; navigating to a set of one or more elevators along the route; identifying a location of an elevator call button corresponding to the set of one or more elevators; navigating to the location of the elevator call button and pressing the elevator call button, wherein pressing the elevator call button comprises: rotating the robot in place until a vertical structure faces the elevator call button; extending or retracting the vertical structure until a button pushing element is aligned with the elevator call button; moving towards the elevator call button and causing the button pushing element to press the elevator call button.

20 Claims, 13 Drawing Sheets

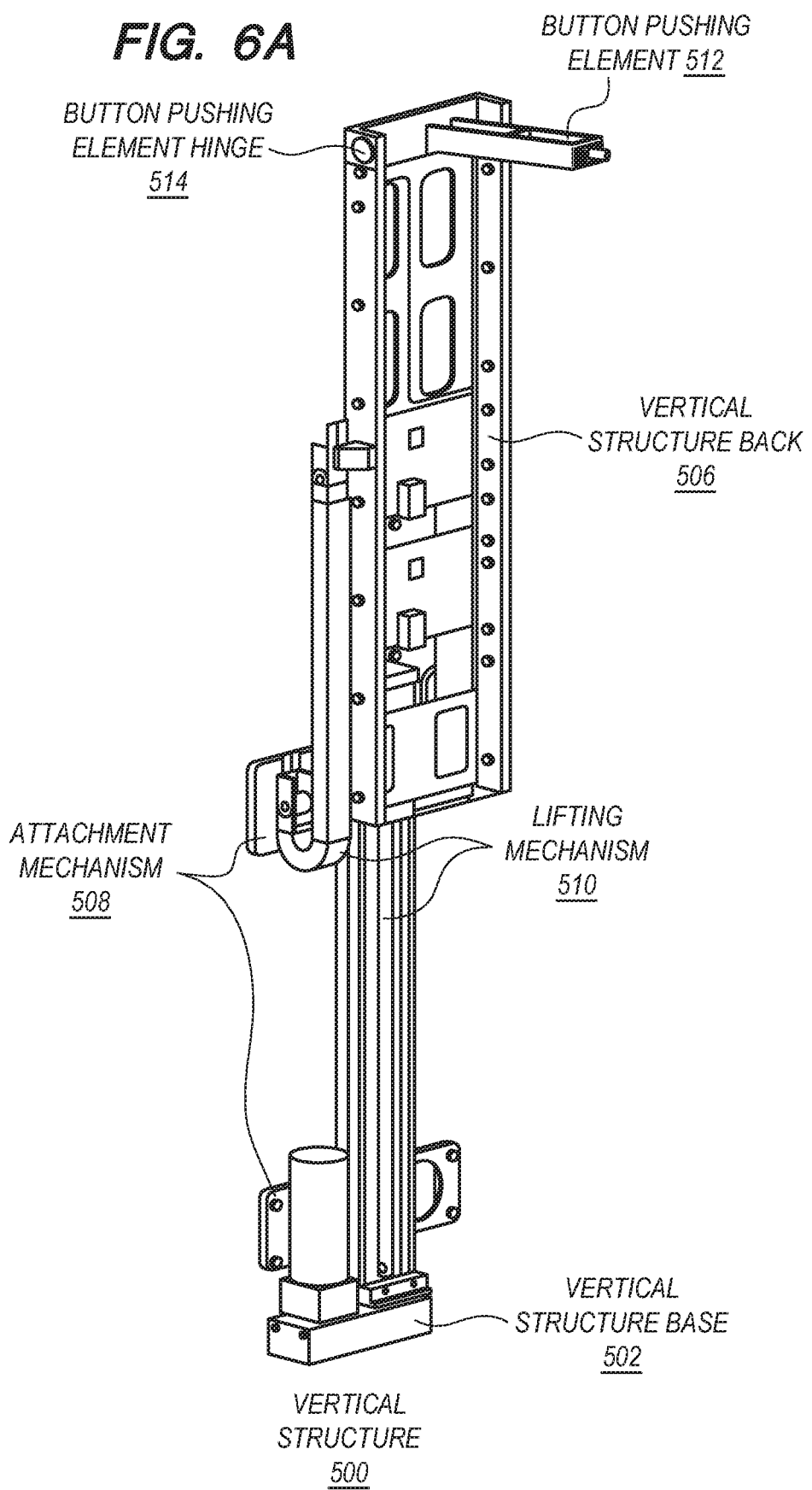

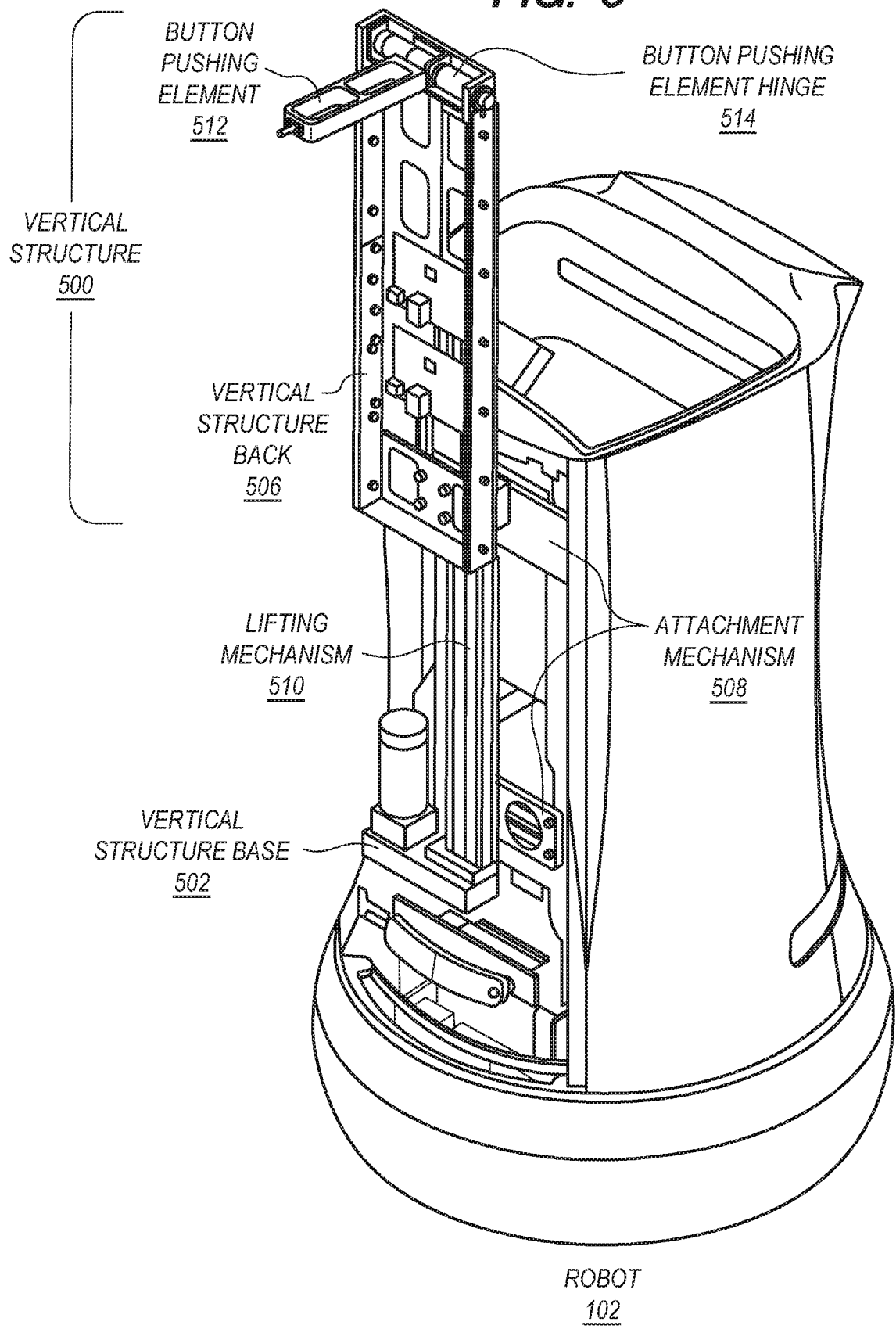

US 10,857,679 B1

APPARATUS AND METHOD FOR AUXILIARY MOBILE ROBOT FUNCTIONALITY

BENEFIT CLAIM

This application claims the benefit under 35 U.S.C. 119(e) of provisional application 62/553,076, filed Aug. 31, 2017, the entire contents of which are hereby incorporated by reference for all purposes as if fully set forth herein.

FIELD OF THE DISCLOSURE

The present disclosure relates to mobile digital computer-controlled robots that autonomously interact with elevator controls while navigating a bounded area.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Robots are no longer only used in manufacturing. Increasingly, robots have found use in hospitality, medicine, and transportation of goods. Some robots, such as those designed and manufactured by Savioke, Inc. of San Jose, Calif., are wheeled machines that transport goods within a campus or other defined environment, such as a hotel or hospital. These robots are deployed by computer or human operators to complete a task, such as delivering hot towels to a guest room. Once deployed, a particular robot may navigate a building or set of buildings from its current location to its destination. In order to navigate to its destination, the robot uses data defining a layout of the campus or environment. The data may be stored in the form of a digital map of a campus, building, or floor within a building.

In order to operate elevators, request operation of electronic doors, or control security sensors, the robot may communicate with a facilities access computer that communicates with electronic systems within the building. However, the robot may be limited to navigating buildings that include a facilities access computer. Furthermore, prior to deployment in a building, the robot must be specifically programmed to communicate with the facilities access computer, such as using an application programming interface (API) provided by the facilities access computer. Some robots may include an arm that can be used to press buttons, such as those used to operate elevators. However, robot arms have a large degree of freedom, which requires a significant amount of space to move within. The robot cannot enter or move around in an elevator with other occupants. Thus, there is a need for a compact, flexible method for robot operation of elevators.

SUMMARY OF THE INVENTION

The appended claims may serve as a summary of the invention.

BRIEF DESCRIPTION OF THE DRAWINGS

In the drawings.

FIG. 6A illustrates a rear isometric view of a vertical structure, according to various embodiments.

FIG. 9 illustrates a vertical structure coupled to a robot, with the vertical structure in a raised position, according to various embodiments.

DETAILED DESCRIPTION

Figure 1:
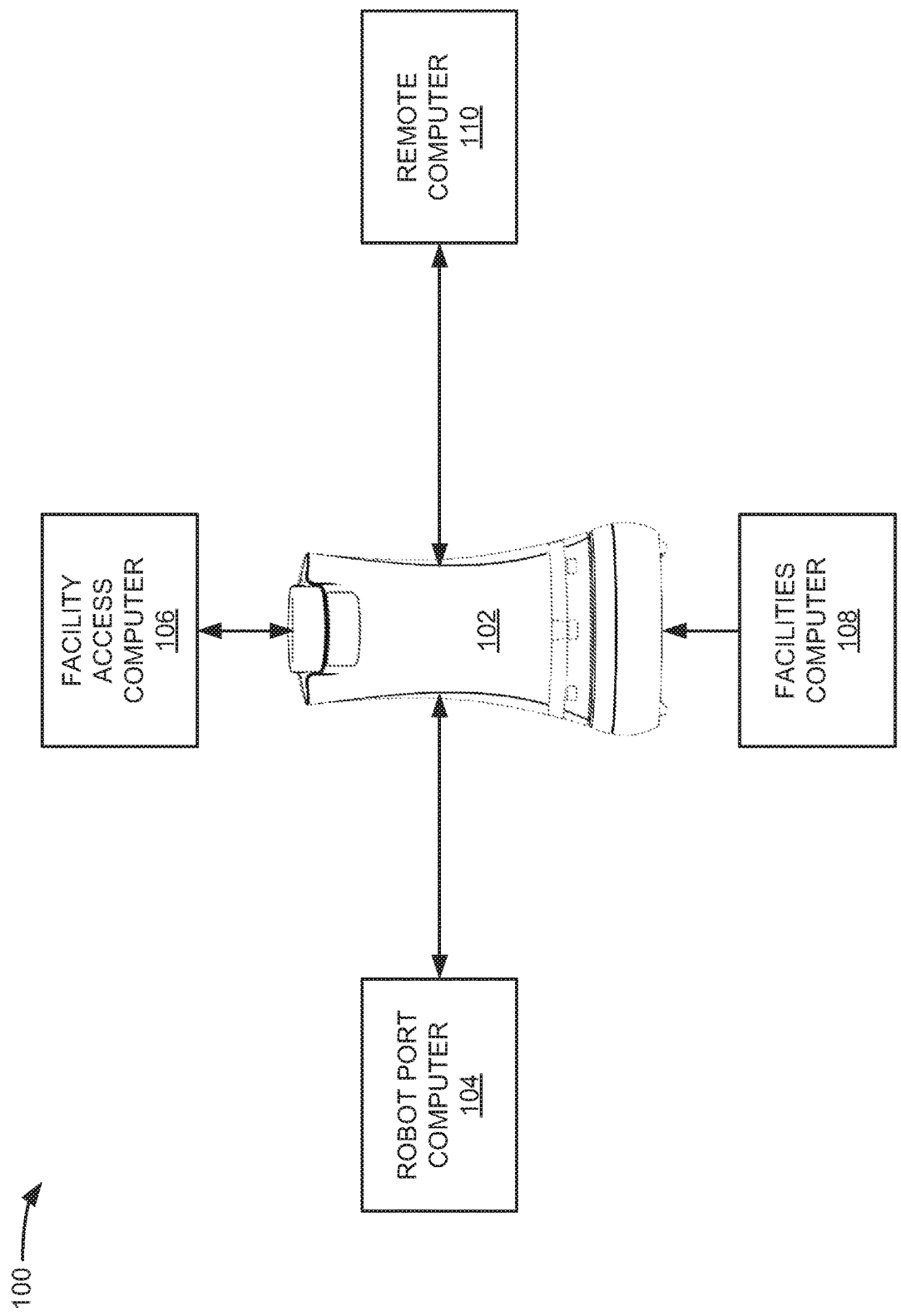
FIG. 1 is a diagram of a networked environment in which a robot may operate, according to various embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

In one embodiment, digital computer controlled electromechanical robots may be deployed within a building. The robots may be programmed to navigate areas of the building. For example, a robot may be programmed to transport items between people or locations. As another example, a security robot may be programmed to patrol areas of a building. While navigating areas of the building, the robot may encounter elevators, electronic doors, or other interactive building features.

To operate an elevator or electronic door, the robot comprises a motor-powered vertical structure. The robot digitally controls the motor of the structure to extend or retract the structure. The panel comprises a perpendicular pushing element that can be used to exert force on a button and push the button. In an embodiment, the perpendicular pushing element is in a fixed position. Additionally or alternatively, the pushing element may be hinged and folded flat against the vertical structure or retracted into the vertical structure when not in use. Extending the vertical structure may include extending the pushing element outwards into a perpendicular position. Additionally or alternatively, the pushing element may move horizontally, side-to-side, when extended into a perpendicular position.

In an embodiment, the robot is configured to identify a button corresponding to an elevator or electronic door, such as an elevator call button or a door open button. The robot may align itself with the button, extend the vertical structure, and move towards the button to cause the pushing element to push the button. Additionally or alternatively, the robot is configured to determine whether any humans are near the robot and, if any humans are nearby, request assistance for pushing the button. The robot may be configured to only push the button if there are no humans nearby or no humans are willing to push the button.

In an embodiment, the robot includes numerous sensors for receiving data about the building and its location within the building. The robot may identify the button corresponding to the elevator or electronic door based on a stored location of the button within the building and the location of the robot within the building.

The use of location and positioning information improves the functioning of the robot itself. The robot is able to interface with elevators without being specifically programmed to scan an area with cameras and visually identify button locations. Additionally, the robot can use the onboard sensors to determine whether it is at a particular floor without being specifically programmed to scan an area with cameras and visually identify floor numbers or other displays.

The use of the vertical structure improves the functioning of the robot itself. The robot is able to interface with elevators without being specifically programmed to interact with or integrate with the elevators' control electronics. The robot may be set up for use within a building by a technician or operator, rather than by a programmer. Additionally, the robot is able to push a button primarily using the body and motors of the robot itself, rather than using a large motorized 'arm.' The robot is more agile and able to turn in place, and does not have a robot arm which requires space around the robot to maneuver.

For purposes of illustrating clear examples, certain sections of this disclosure refer to specific environments such as a hotel or building, or to specific environmental features such as floors or elevators. However, these examples are provided only for clarity and are not intended to limit the scope of the disclosure. For example, the term "environment" may include buildings of any kind including hotels, offices, hospitals, homes, museums, restaurants or any other space that is capable of traversal by a mobile ground traveling autonomous vehicle such as a robot. Features of environments may include floors, levels, stairways, ramps, slides, elevators, doors, windows, sidelights, transoms, tunnels, breezeways, skywalks, portals, columns, partitions, walls, objects, obstacles and so forth.

2. Networked Environment

FIG. 1 is a diagram of an example networked environment in which a robot may operate, according to various embodiments.

The networked environment 100 of FIG. 1 provides certain computing infrastructure to support a robot 102, to allow the robot to access building features such as locked doors or elevators, and to allow an operator to communicate directly with the robot. The networked environment 100 includes the robot and one or more computers that are local to the building or campus in which the robot is deployed. In some embodiments, remote computers may be included in the networked environment 100. The local computers within the networked environment 100 may be physically present in the building.

In this example, the robot 102 is an autonomous, wheeled, battery-powered electro-mechanical robot under control of a programmed digital computer contained in the robot. The robot 102 moves using a set of wheels mounted on the bottom surface of the robot. The robot 102 may move at velocities appropriate to its environment, typically at a human walking speed or slower. The wheels of the robot 102 may be selected for performance on a variety of indoor and outdoor surfaces including tile, carpet, and concrete.

In some embodiments, robot 102 includes at least one storage compartment that can be electronically opened by the robot for access by an operator or human at an origin or destination. The storage compartment may be sized to hold items that are appropriate to the environment. For example, in hospitality applications, the storage compartment may permit carrying any of: linens; toiletries; medications; magazines and reading materials; lost and found items such as wallets, keys, and personal electronic devices.

The storage compartment may have an electronic lock that is controlled by the robot 102. In some embodiments, robot 102 is programmed to open the storage compartment upon arriving at its destination or in response to an instruction or sensor when the destination is reached. The instruction may include, for example, a passcode; a confirmation of the person's identity at the destination; an electronic communication with a personal electronic device of the person receiving the delivery via, for example, RFID or Bluetooth. The storage compartment may include a scale, pressure switch or other mechanism to detect the placement or removal of items in or from the storage compartment, such that placing an item in the compartment depresses the scale or triggers the switch and removing the item from the compartment releases the scale or switch. A digital interface may gate or latch a signal from the scale or switch to instruct the computer in the robot that an item was placed on or removed from the compartment.

In an embodiment, robot 102 includes a touchscreen that displays a graphical user interface (GUI) to communicate messages and that is generated under program control. The GUI may receive input via the touchscreen and the input may represent instructions for operation of the robot 102. The instructions may include an instruction to open the storage compartment, a response to a request for information presented by the robot during an autonomous mapping operation; an alert in response to receiving unusual sensor data during an autonomous collection operation; a confirmation that the item, or the correct item, is in the storage compartment and is delivered. In some embodiments, other input mechanisms such as keyboards may be incorporated in robot 102.

In an embodiment, robot 102 includes numerous sensors for receiving data about the building and its location within the building. These sensors include, for example, laser sensors, Light Detection and Ranging (LIDAR) position or motion sensors, 3D cameras, color cameras, accelerometers, barometers, altimeters, thermometers, humidity meters, or others. In an embodiment, the laser sensors, LIDAR, 3D cameras, and color cameras collect data that can be transformed under program control to form a model of an environment and its obstructions or objects; dimensions of features such as rooms, hallways, doors, and windows; identification of features including staircases, elevators, doorways, signs, and fiducials; and other environment data. In an embodiment, the barometer detects an altitude of the robot 102 based on digitally transforming a reading of ambient atmospheric pressure and provides data that may be used, for example, to identify a floor on which the robot 102 is currently located if the environment is multi-story. In an embodiment, the accelerometer provides data about the speed and/or direction of the movement of the robot 102, alone or in combination with a digital compass. In an embodiment, the thermometer provides data about the ambient temperature of the location at which the robot 102 is currently located. In an embodiment, a humidity meter or other moisture sensor provides data about the humidity of the location at which the robot 102 is currently located, or about whether water or other liquids are detected at the location.

Additionally or alternatively, the sensors collect data that can be transformed under program control to, for example, detect the presence of one or more humans in the area at which the robot 102 is currently located, detect opening and closing of doors, determine the location of the robot 102 within or around a building, and/or detect the floor number at which the robot 102 is currently located.

In an embodiment, robot 102 comprises one or more network interfaces that communicate with the computers within the networked environment 100. The network interfaces may include interfaces that communicate via Wireless Fidelity (WIFI), 3G and/or 4G modems, Bluetooth, infrared, and low-bandwidth radio. In some embodiments, the robot 102 uses a Global Positioning System (GPS) to determine its location. In some embodiments, the robot 102 uses the WIFI interface to wirelessly transmit signals to other wired or wireless networked devices to open doors, or call and direct an elevator.

In an embodiment, robot 102 uses one or more network interfaces to receive a signal from a device such as a WIFI router, a modem, a Bluetooth or infrared device, and the like, and digitally transforms the signal data to determine a signal measurement. The signal measurement may indicate a signal strength or signal quality of the device.

In an embodiment, robot 102 executes mapping software stored in memory. The mapping software, when executed, causes the robot to generate a robot-readable map of its location and/or a route to a destination. In an embodiment, the mapping software instructs the robot 102 to traverse or explore its environment using the onboard sensors. In an embodiment, based on the traversal, the mapping software generates a map of a floor or other environment.

In an embodiment, the environment includes a robot port having a robot port computer 104. The robot port is a device in which, or next to which, the robot 102 returns when not in use. In an embodiment, the robot port may include power connections to which the robot 102 can automatically connect and that charge a battery of the robot. For example, the robot and port may be structured to enable the robot to automatically contact the power connections when the port is reached or mechanically engaged.

In an embodiment, the port further comprises a data interface and data connector to which the robot 102 may automatically connect or engage when the robot is in the port. Or, the robot 102 may have internal wireless networking circuitry that is interfaced to its CPU and appropriate software to permit the robot to establish a wireless network connection to a nearby access point and thereby reach a host computer to upload or download data. In an embodiment, using the data interface of the port or the wireless interface, the robot port computer 104 may download from the robot 102 data comprising a list of deliveries, a history of the robot's, and communications between the robot and other computers or received via the GUI. In some instances, the robot port computer 104 or host computer may upload data to the robot 102 including, for example, software updates, map or facility updates, and data used to identify building-specific features such as doors. In some embodiments, port computer 104 or another host computer is programmed to obtain, via a network, environment data for environments other than the one in which robot 102 is located, including traversal data obtained from other robots that have operated in other environments. The other environments may be closely similar to the local environment or different. For example, if the local environment is a building structure that has been constructed according to a plan that has been replicated to construct other similar buildings in other locations, then traversal data obtained from other robots that are geographically distant may be relevant in resolving traversal of obstructions or features of the local environment. Furthermore, robot port computer 104 may act as an intermediary to communicate data between robots 102 deployed within the building or on campus.

In an embodiment, a facilities access computer 106 provides access to building features that accommodate the robot 102. The facilities access computer 106 may provide an application programming interface (API) that the robot 102 is programmed to call with instructions and data configured to direct the facilities access computer to operate elevators and other transportation mechanisms, request operation of electronic doors, or control security sensors. In an embodiment, the facilities access computer 106 communicates with the electronic systems within the building such as elevators, door locks, door opening systems, security sensors, and the like.

In an embodiment, facilities computer 108 is programmed with supervisory functions for one or more robots 102 and provides an interface for an operator to communicate with the robot. The facilities computer 108 may respond to requests made by the robot 102 during autonomous mapping. The facilities computer 108 may deploy the robot 102 on pick-ups, deliveries, or other tasks. In some embodiments, the facilities computer 108 may provide data regarding the location of temporary obstacles in the environment. Examples include holiday decorations, large crowds, and temporary installations. The data may be stored in a persistent data repository and associated with an anticipated expiration date or time-to-live value. The data may be communicated directly to the robot 102 via WIFI or via the robot port computer 104.

In an embodiment, a remote computer 110 in FIG. 1 comprises a computer that is not local to the robot 102 and is not located within the building or campus in which the robot 102 is deployed. The remote computer 110 may communicate data with the robot 102 from outside sources; examples include weather data, news and public interest stories, or other sources that provide data used by the robot 102. In some instances, the remote computer 110 may be, or communicate with, a personal electronic device of a human user who has arranged a delivery. In such instances, the remote computer 110 may be a Short Message Service (SMS) server or Multimedia Message Service (MMS) server.

3. Vertical Structure

In an embodiment, robot 102 includes an exterior vertical structure that may be raised or lowered to different vertical heights using a servo, linear actuator, or other electromechanical apparatus under stored program computer control. In an embodiment, the vertical structure has a one degree of freedom in a vertical linear direction and a passive second degree of motion; that is, the vertical structure moves and rotates with the robot, but does not move or rotate in other directions independently of the robot. In other embodiments, the vertical structure may move or rotate independently of the robot. For example, the vertical structure may move up and down, and when the vertical structure is extended fully the vertical structure may also rotate in place.

In an embodiment, the robot 102 is configured to raise and lower the vertical structure quickly under program control. For example, the vertical structure may be fully extended within 10 seconds.

In an embodiment, the vertical structure is integrated with robot 102. The vertical structure may extend upward from the top of robot 102 and retract into robot 102. In some embodiments, the vertical structure is not outwardly visible when it is retracted. For example, robot 102 may include a lid or cover that is opened when robot 102 extends the vertical structure. Additionally or alternatively, the vertical structure may be coupled to the outside of the robot 102.

In an embodiment, the vertical structure is located near the rear of robot 102. In other embodiments, the vertical structure may be located on other sides of robot 102. Additionally or alternatively, the vertical structure may be placed such that the vertical structure does not block any sensors of robot 102 when it is extended. Additionally or alternatively, the vertical structure is positioned so that it does not prevent the opening or closing of any storage compartments of the robot, or block the storage compartments from being accessed.

In an embodiment, the back of the vertical structure, facing away from the robot, includes a pushing element. The pushing element is perpendicular to the vertical structure, parallel to the ground. In an embodiment, the pushing element is in a fixed position. Additionally or alternatively, the pushing element may be hinged and folded flat against the vertical structure when not in use, or retracted into the vertical structure when not in use. Extending the vertical structure may include extending the pushing element outwards into a perpendicular position. Additionally or alternatively, the pushing element may move horizontally, side-to-side, when extended into a perpendicular position.

Figure 5A:
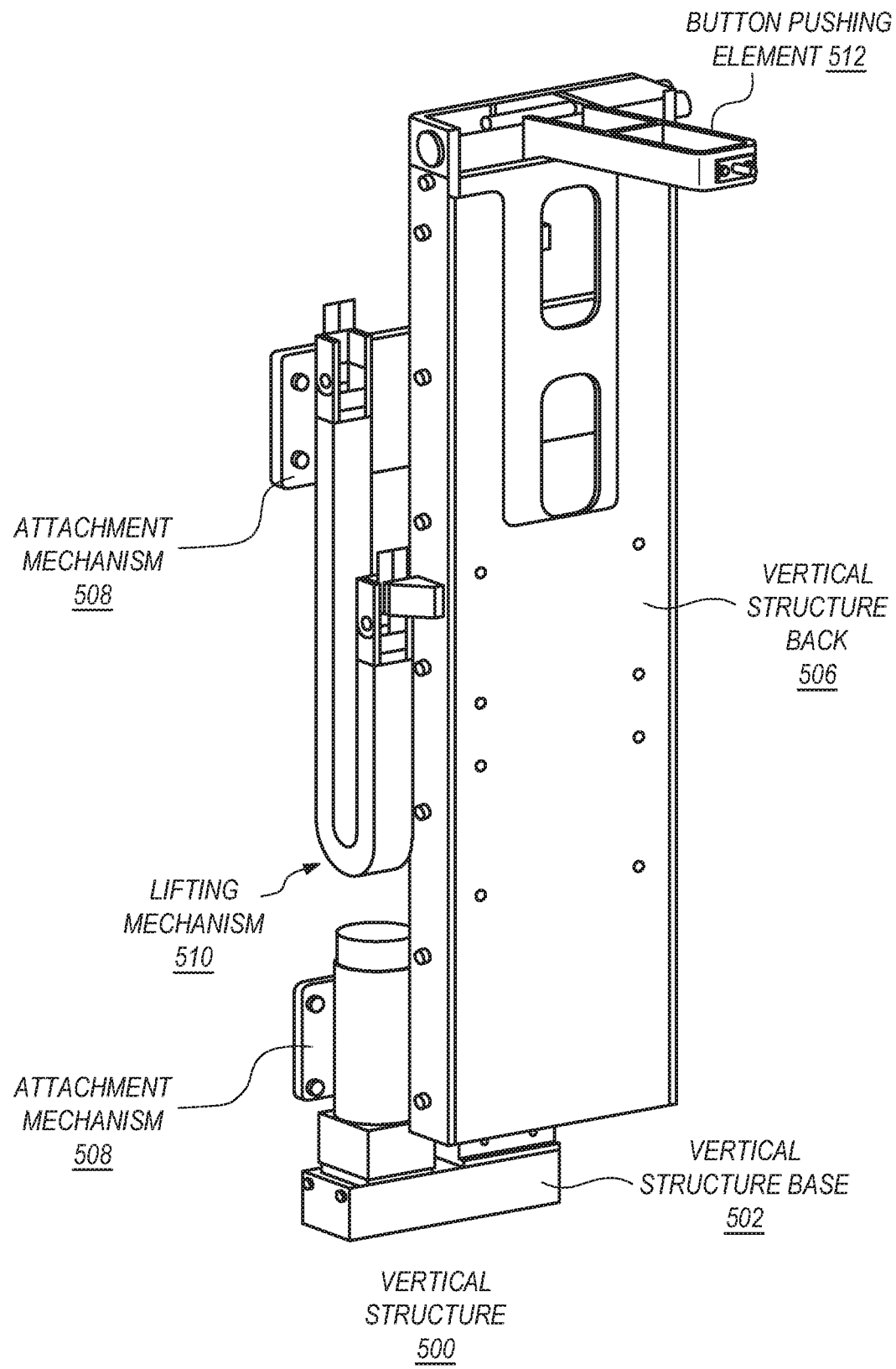
FIG. 5A illustrates a front isometric view of a vertical structure, according to various embodiments.
Figure 5B:
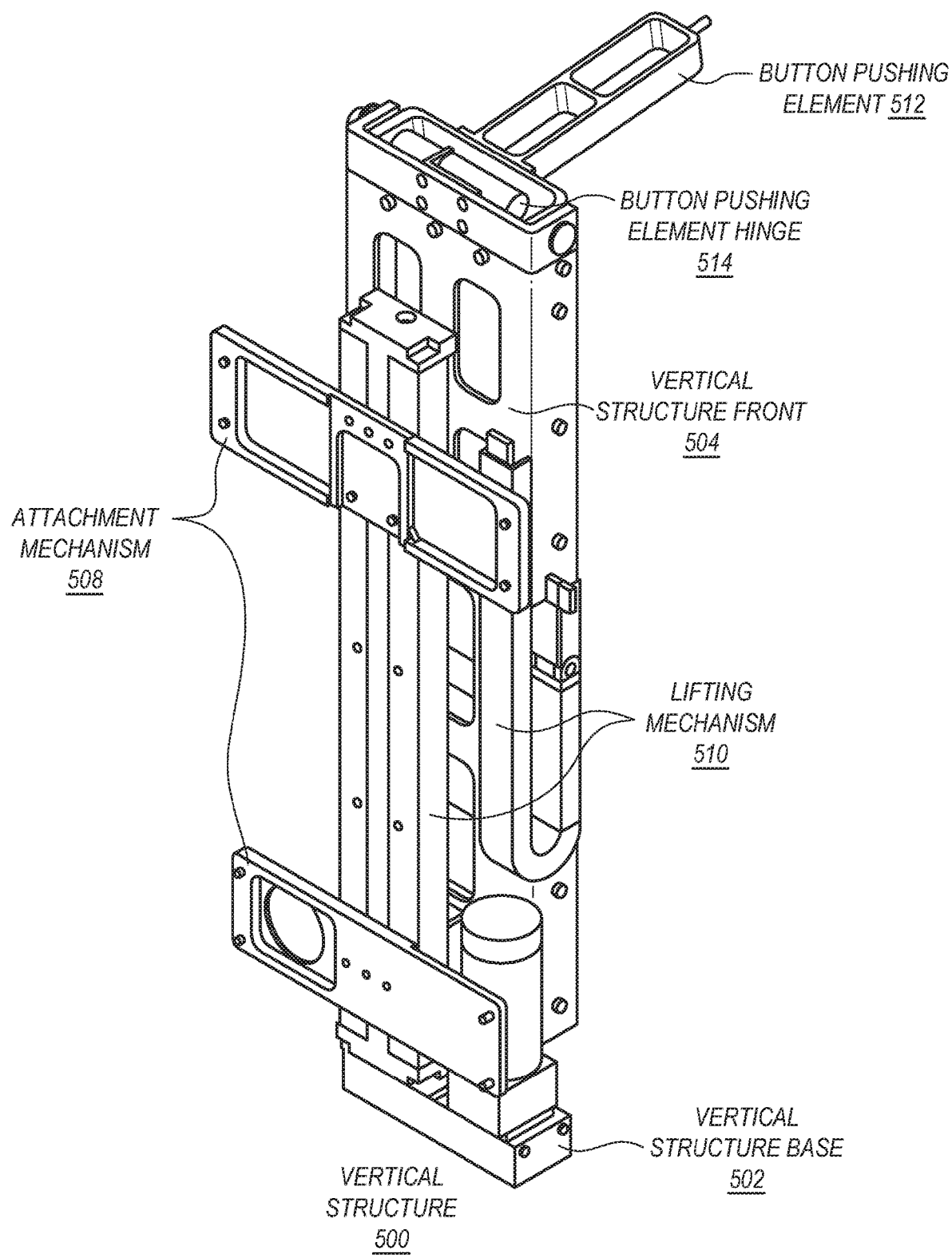
FIG. 5B illustrates a front isometric view of a vertical structure in a raised position, according to various embodiments.

FIG. 5A and FIG. 5B illustrate a vertical structure 500 in a lowered position. FIG. 5A illustrates a rear isometric view of the vertical structure 500. FIG. 5B illustrates a front isometric view of the vertical structure 500. The front isometric view depicts the vertical structure front 504 coupled to a base 502 and the rear isometric view depicts the vertical structure back 506 coupled to the base 502. The vertical structure 500 comprises one or more attachment mechanisms 508 for attaching the vertical structure 500 to a robot, such as robot 102, and a lifting mechanism 510 for raising and lowering the vertical structure 500. Additionally, the vertical structure 500 includes a button pushing element 512. In FIG. 5A, the button pushing element is extended into a perpendicular position. In the embodiment illustrated in FIGS. 5A and 5B, the button pushing element 512 is extended in a perpendicular position using a button pushing element hinge 514. In other embodiments, other mechanisms may be used for extending the button pushing element 512 outwards and/or for rotating the button pushing element 512.

Figure 6B:
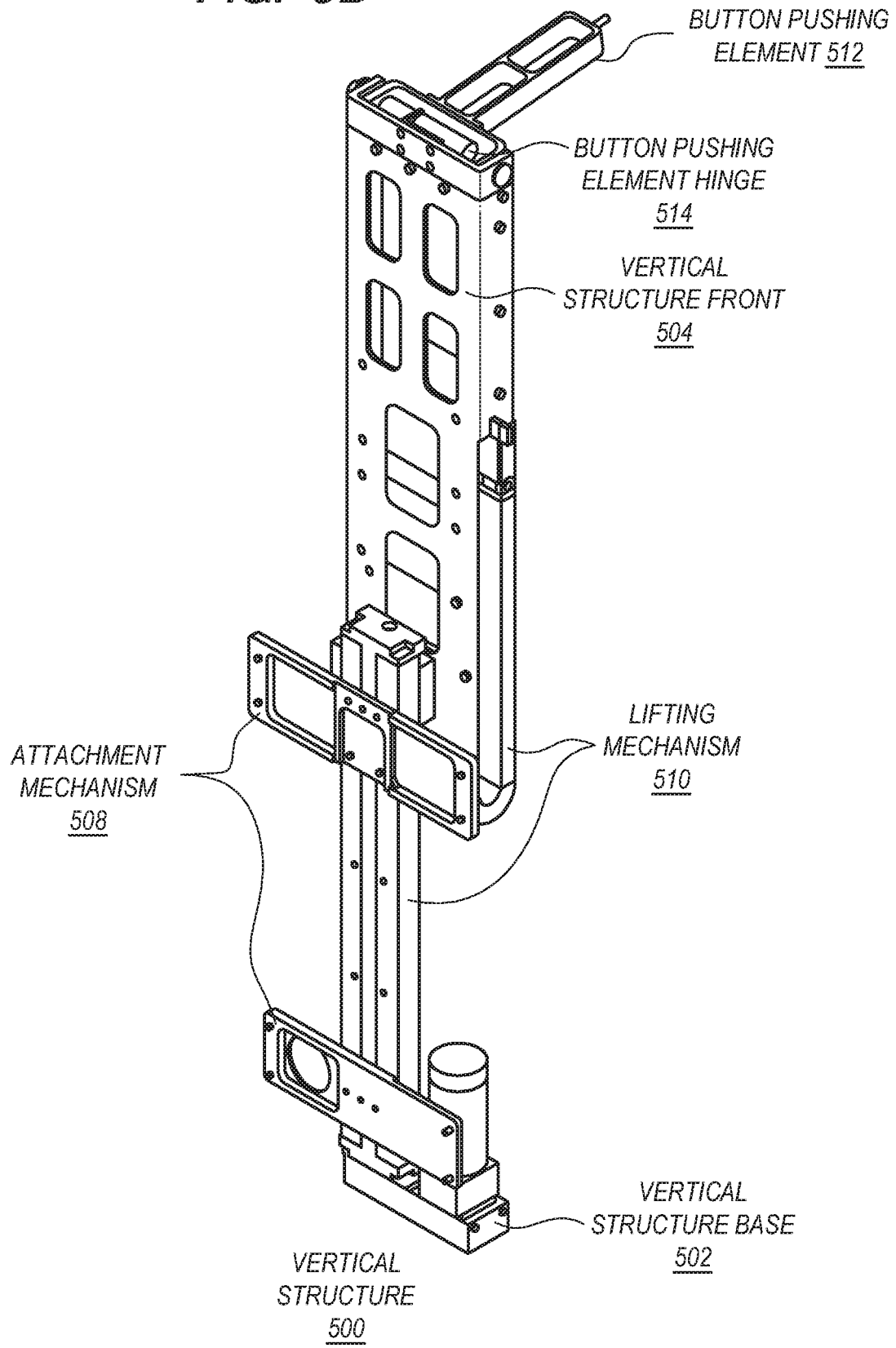
FIG. 6B illustrates a rear isometric view of a vertical structure in a raised position, according to various embodiments.

FIG. 6A and FIG. 6B illustrate the vertical structure 500 in a raised position. FIG. 6A illustrates a rear isometric view of the vertical structure 500 and FIG. 6B illustrates a front isometric view of the vertical structure 500. The front isometric view depicts the vertical structure front 504 coupled to the base 502, the lifting mechanism 510 for raising and lowering the vertical structure 500, attachment mechanisms 508 for attaching the vertical structure 500 to the robot, and the button pushing element 512. The rear isometric view depicts the vertical structure back 506 coupled to the base 502, the lifting mechanism 510 for raising and lowering the vertical structure 500, attachment mechanisms 508 for attaching the vertical structure 500 to the robot, and the button pushing element 512. In the illustrated embodiment, the vertical structure 500 is raised by extending the lifting mechanism 510 outwards from the base 502.

Figure 7:
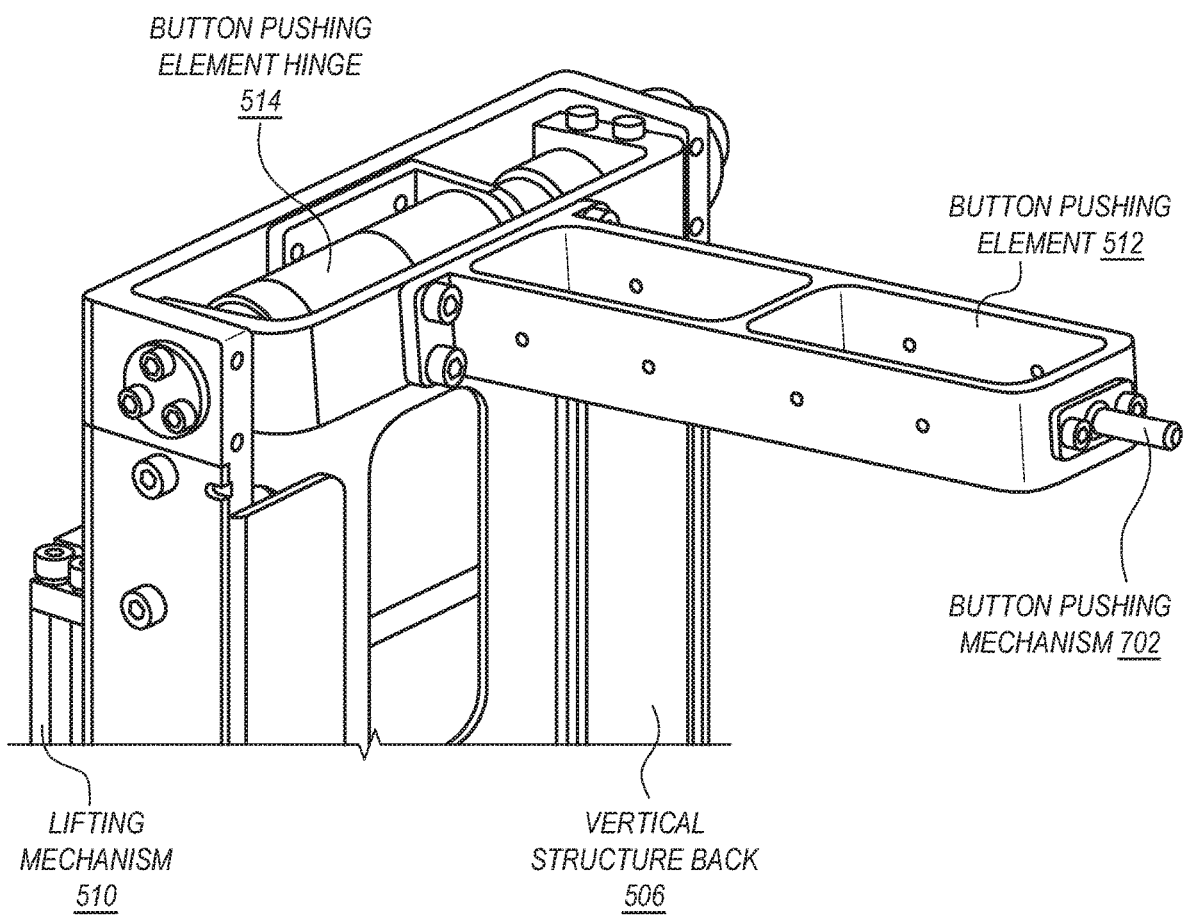
FIG. 7 illustrates an isometric view of a button pushing element, according to various embodiments.

FIG. 7 illustrates an isometric view of the button pushing element 512. The button pushing element 512 is extended perpendicular from the vertical surface 500 via button pushing element hinge 514. In the illustrated embodiment, the button pushing element 512 includes a button pushing mechanism 702 at the tip. The button pushing mechanism 702 may be the portion of the button pushing element 512 that connects with buttons when pushing buttons. Aligning the button pushing element and/or vertical surface with a button may comprise aligning the button pushing mechanism, in its extended position or its anticipated extended position, with the button.

Figure 8A:
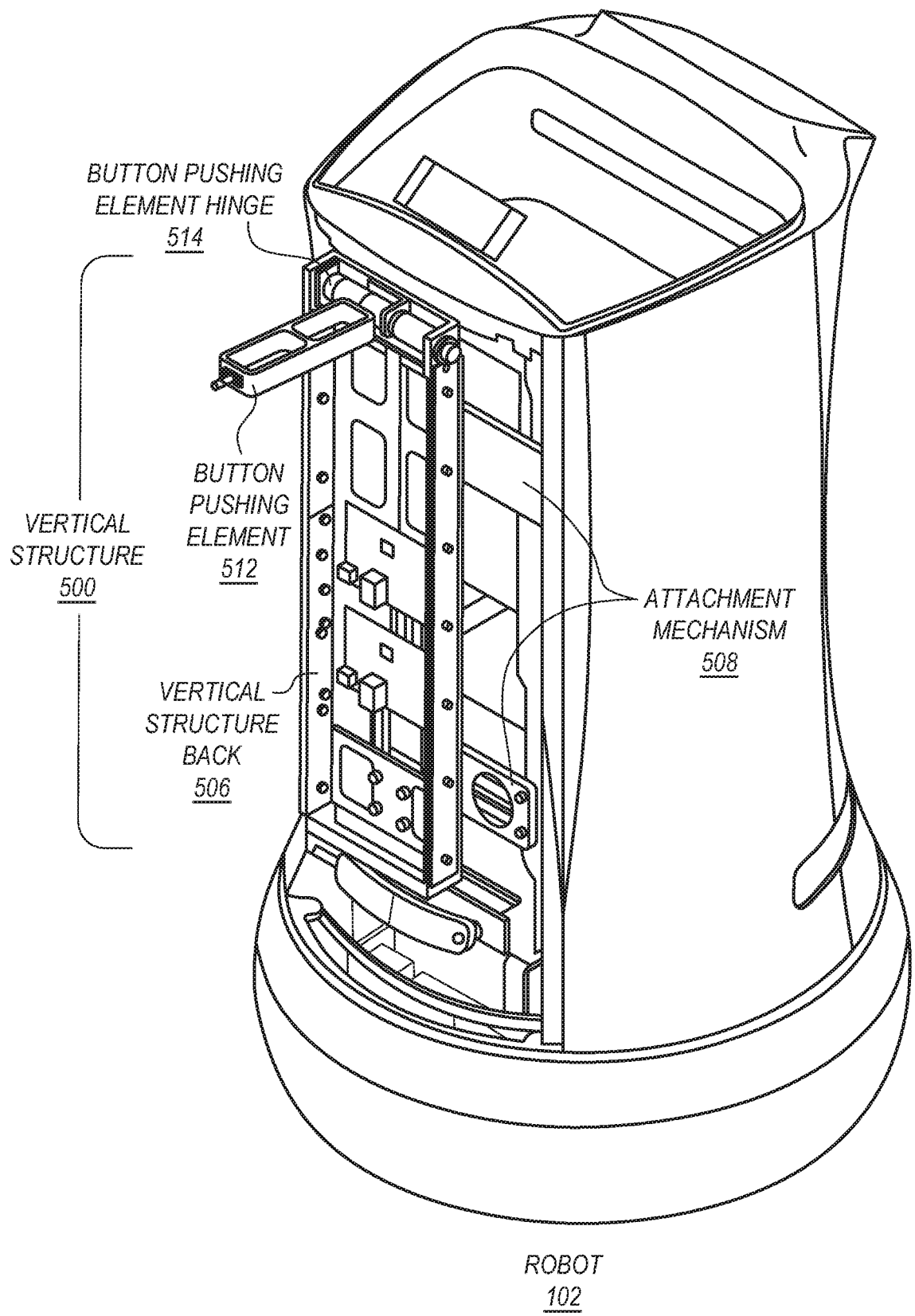
FIG. 8A and FIG. 8B illustrate a vertical structure coupled to a robot, with the vertical structure in a lowered, according to various embodiments.
Figure 8B:
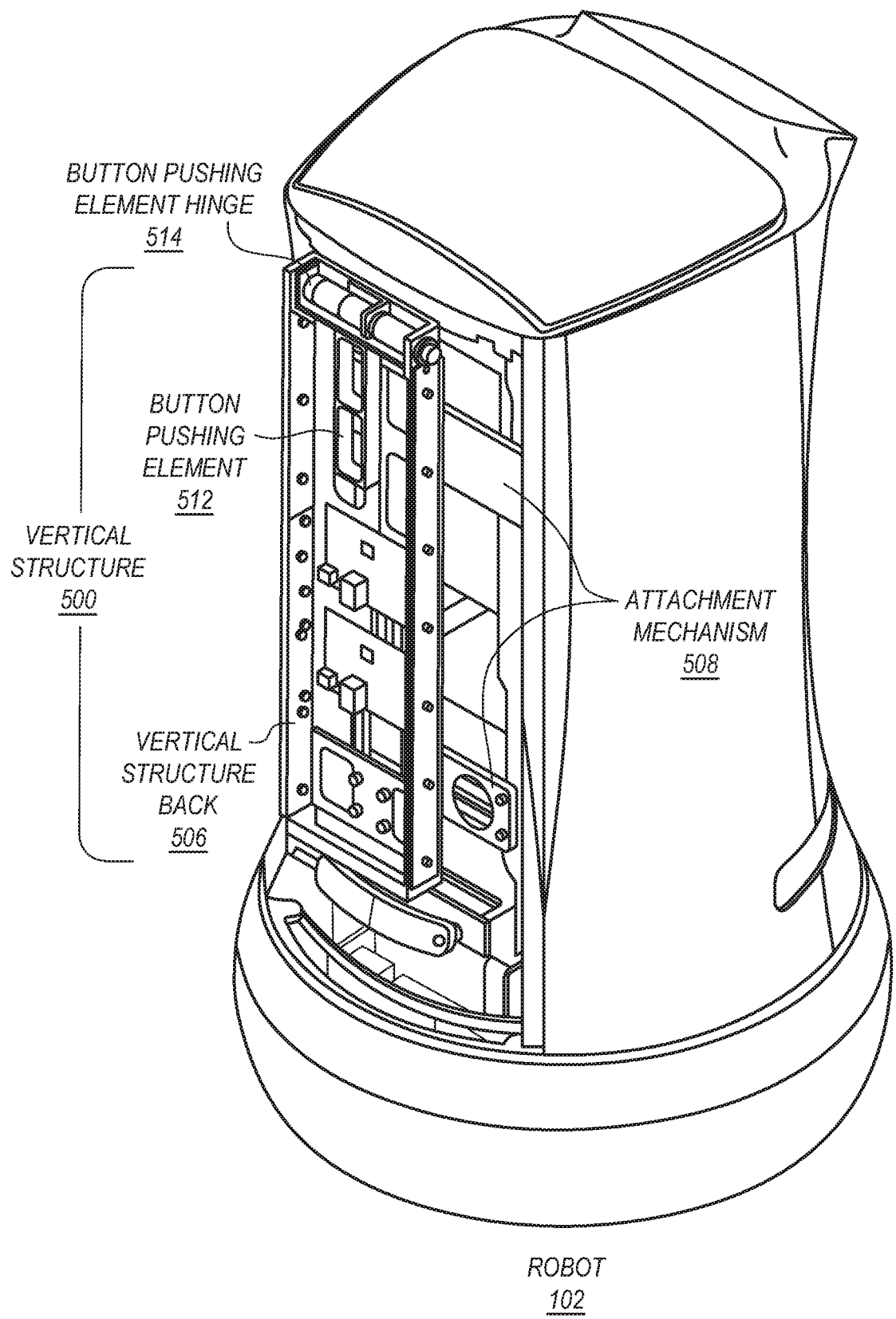

FIG. 8A and FIG. 8B illustrates the vertical structure coupled to a robot, with the vertical structure in a lowered or 'stowed' position. In FIGS. 8A and 8B, vertical structure 500 is coupled to robot 102 using the attachment mechanisms 508. In FIG. 8A, the button pushing element 512 is extended perpendicular from the vertical surface 500. In FIG. 8B, the button pushing element 512 is folded flat against vertical surface 500 in a 'stowed' position.

FIG. 9 illustrates the vertical structure coupled to a robot, with the vertical structure in a raised position or 'deployed' position. In the illustrated embodiment, the vertical structure 500 is raised by extending the lifting mechanism 510 outwards from the base 502.

In an embodiment, the front of the vertical structure facing the robot, vertical structure front 504, includes a graphical display screen. The display screen may be used to display communications or other content to users. The display screen may operate in conjunction with other displays, touchscreens, and input devices of the robot. The display screen may provide text, graphics, audio, video, and the like. For example, the display screen may display information about the robot's task(s), the robot's status, building parameters, global queuing details, medication information, supply inventor, robot or payload instructions, and etc. Additionally or alternatively, the front of the vertical structure may comprise additional input or output devices, such as one or more speakers, microphones, cameras, and etc. The display screen may be used for teleconference or telepresence, such as human-mediated or automated language translation services, remote physician or pharmacist consultations, and etc.

Figure 10:
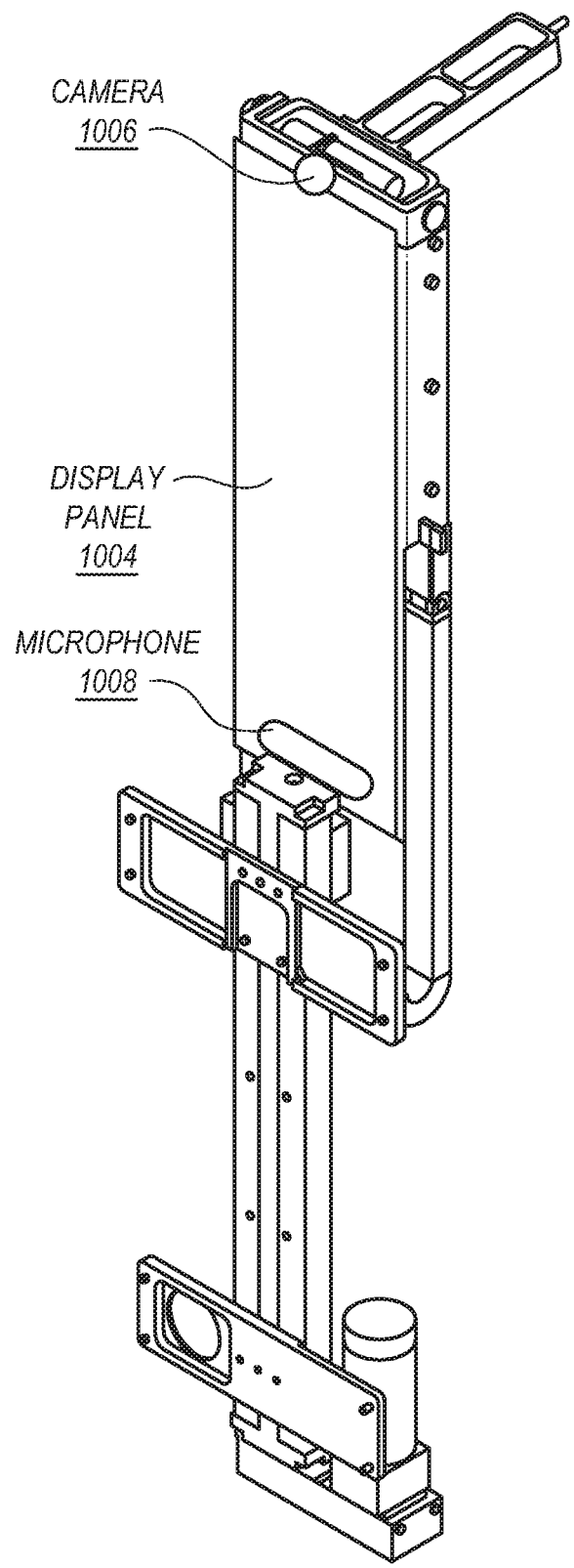
FIG. 10 illustrates a front of a vertical structure, according to various embodiments.

FIG. 10 illustrates an example front of the vertical structure comprising a display panel 1004, camera 1006, and microphone 1008. The display panel 1004, camera 1006, and microphone 1008 may be hidden when the vertical structure 500 is in a lowered position and visible and/or active when the vertical structure 500 is in a raised position.

A benefit of the vertical structure is the reduced degree of freedom reduces the complexity of a button pushing mechanism that is integrated into the panel. A robot that includes the vertical structure instead of a robotic arm has a lower production cost and a simpler mechanism. Additionally, the vertical structure minimally impacts the overall shape and size of the robot. Even when the vertical structure is extended to push a button, the footprint of the robot does not change.

4. Robot Button Pushing

In an embodiment, robot 102 is programmed or configured to identify, using one or more sensors of the robot, one or more buttons of a button panel. As referred to herein, a button panel comprises one or more buttons. A button panel may comprise a physical panel, trim, or faceplate that surrounds the one or more buttons. Additionally, if the button panel comprises a plurality of buttons, the plurality of buttons may be arranged into rows and columns.

In an embodiment, the robot is trained to identify button locations for one or more button panels of a building. Robot 102 generates and stores a map of each button panel. The map may indicate the location of each button in the button panel. Additionally, the map may indicate the location of the button panel. Robot 102 may store the map in onboard memory or transmit the map to storage accessible by robot 102, such as robot port computer 104 or other host computer.

In an embodiment, generating a map of a button panel comprises the robot 102 physically traversing to the location of the button panel. The robot may follow a human operator who indicates the location and direction of the button panel to the robot upon arrival. Additionally or alternatively, the robot 102 may receive instructions indicating the location of the button panel. On arriving at the location, the robot may rotate in place and use one or more sensors to determine the direction of the button panel. The robot 102 may use one or more sensors of the robot to collect and store data describing the button panel. For example, robot 102 may capture an image of the button panel and identify, in the image, the location of one or more buttons on the panel.

Additionally or alternatively, robot 102 may autonomously navigate a building using a robot-readable map. The map may include labels indicating the location of one or more elevators in the building. Robot 102 may physically navigate to the location of each elevator, identify the locations of one or more button panels, and collect and store data describing each button panel using one or more sensors of the robot.

In an embodiment, robot 102 may receive a digital image depicting a button panel. The digital image may include labels indicating the locations of each button on the button panel. Additionally, the robot may receive data indicating the location of the button panel depicted in the image. Alternatively, robot 102 may be configured or programmed to analyze the digital image and identify one or more buttons depicted in the image. Robot 102 may store data indicating the location or position of each button in memory or other storage of the robot.

In an embodiment, robot 102 may identify one or more buttons of a button panel based on the spatial geometry of the elevator. For example, robot 102 may identify, using one or more sensors of the robot, the location of the button panel. Based on the number of buttons in the button panel, the robot may calculate the position of a desired button.

Additionally or alternatively, robot 102 may be programmed or configured to identify button locations using one or more stored rules. For example, the American Disabilities Act (ADA) provides compliance rules that standardize the location and/or placement of elevator buttons and button panels. For example ADA compliance rules specify a minimum and maximum height at which buttons may be placed. Robot 102 may use these rules to limit the area in which it looks for a button or button panel.

As another example, floor number buttons are arranged in ascending order, with the highest floor number at the top. If the floor number buttons are divided into columns, the columns read from left to right. That is, if a panel comprises four columns, the bottom row of numbers would read, from left to right, "1," "2,", "3," and "4." The second row would read "5,", "6," "4," and "8," and so on. Furthermore, elevator number buttons are usually evenly spaced. Once robot 102 determines the configuration and spacing of the buttons, it can use the information to calculate the position of any floor number button.

5. Example Elevator Operation

Figure 2:
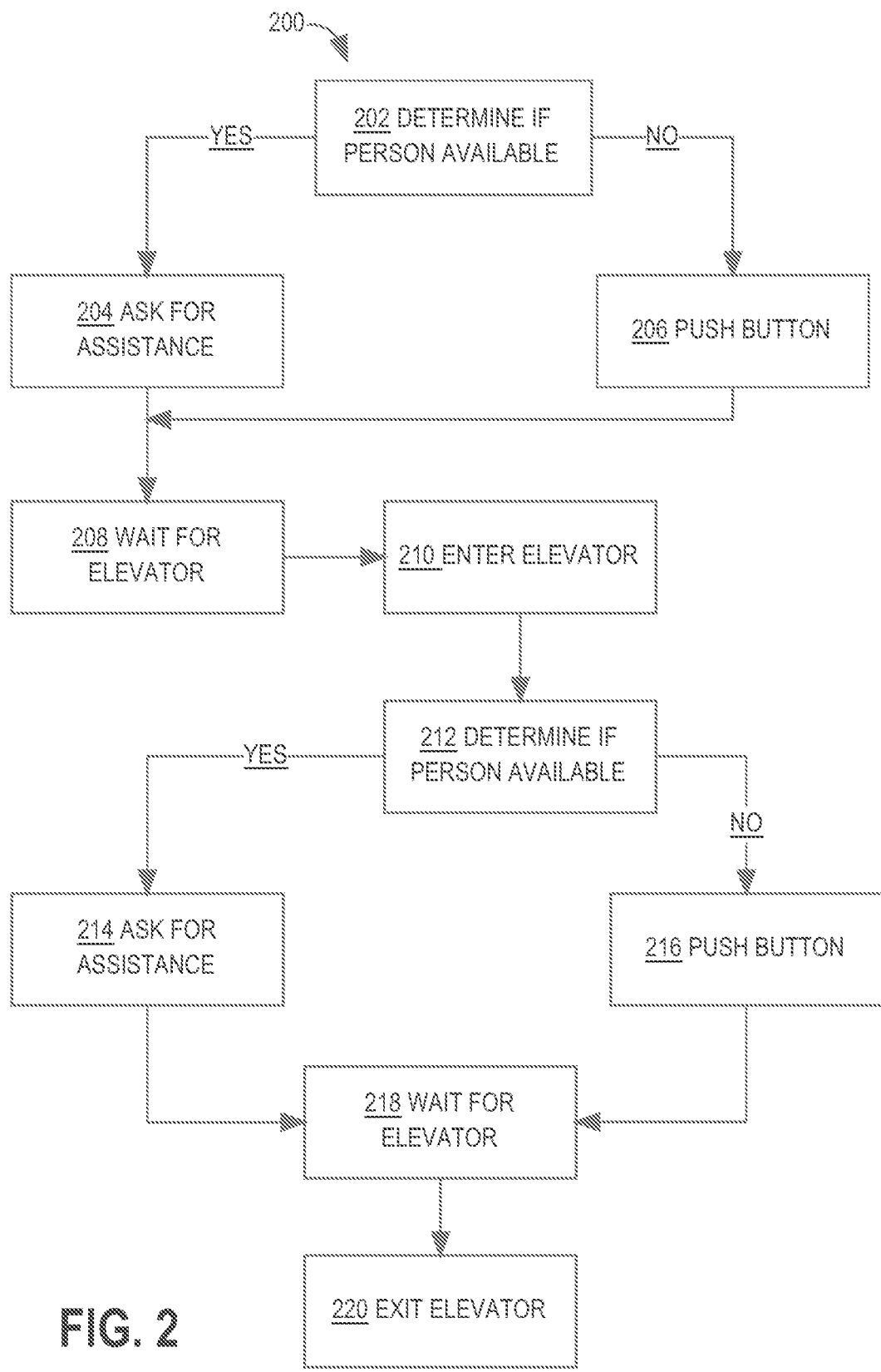
FIG. 2 is a flowchart of an example process for autonomously operating and navigating an elevator, according to some embodiments.

FIG. 2 is a flowchart of an example process that may be programmed in a robot for operating and navigating an elevator, according to certain embodiments. In an embodiment, robot 102 executes a stored program implementing process 200 shortly after arriving at one or more elevators. Robot 102 may be traversing a route that includes taking an elevator to a particular floor. During execution of process 200, robot 102 calls and takes an elevator to travel to the particular floor.

In an operation 202, the robot determines whether anyone is available near the elevator using one or more sensors of the robot. For example, while in an elevator lobby, robot 102 may rotate in place and use one or more cameras to determine whether any people are also in the elevator lobby.

If at least one person is available, in an operation 204, the robot requests assistance from the person. In an embodiment, if multiple people are available, robot 102 may select a particular person to request assistance from and turn towards the particular person. Additionally or alternatively, robot 102 may identify the direction with the most people and turn towards that direction.

In an embodiment, the robot 102 requests assistance by displaying a message on a display of the robot 102, such as a touchscreen or the front of the vertical structure. The message indicates the particular floor the robot is trying to navigate to, and requests the person press the appropriate elevator button. For example, robot 102 may display the message "Please help me get to floor 10."

Additionally or alternatively, the robot 102 requests assistance by causing a sound to be played from one or more speakers of the robot. In an embodiment, the robot 102 plays an alert sound. The sound may notify people near the robot to look at the message displayed by the robot. Additionally or alternatively, the robot 102 plays a message requesting assistance. The message may indicate the particular floor the robot is trying to navigate to. For example, the robot 102 may play the message "Please help me get to floor 10."

If no one is available, in an operation 206, the robot identifies and pushes an elevator call button. In an embodiment, the robot 102 navigates to and aligns itself in front of the button panel. Additionally or alternatively, robot 102 may position itself a short distance from the wall, such as 2 to 3 centimeters.

In an embodiment, to push the button, the robot 102 rotates until the vertical structure is facing the button panel. Robot 102 causes the vertical structure to move up or down until the pushing element is the height of the desired button. The robot moves towards the button to cause the pushing element to exert an appropriate force on the button, such as the amount of force a human would exert to push the button. Additionally or alternatively, robot 102 may be configured to move a particular distance. For example, if robot 102 is initially positioned 2 centimeters from the wall, it may be configured to move 2 centimeters to push the button.

In an operation 208, after pushing the button or asking for a person to push the button, the robot waits for an elevator to arrive. In an embodiment, robot 102 navigates to a waiting for elevator pose and waits for an elevator door to open. As referred to herein, an elevator pose represents a defined region where the robot is programmed or configured to navigate to in order to wait for the next action. The defined region may be a region next to or near an elevator door. Additionally or alternatively, the robot may select an open space within the region.

In an embodiment, if there is a single elevator, robot 102 navigates to the area in front of the elevator door. If there are a plurality of elevators in the area, robot 102 selects a location central to the plurality of elevators. Additionally or alternatively, robot 102 determines, using one or more sensors of the robot, which elevator is answering the call and navigates to the area in front of the arriving elevator.

In an embodiment, if one or more people are in the area, robot 102 may analyze their pose to determine which elevator is arriving. For example, if multiple people are facing a particular elevator door, robot 102 may assume that the particular elevator is the one that is arriving.

In an embodiment, robot 102 may detect whether an indicator light is on for a particular elevator. A light may be positioned at or near the door of each elevator. The light may turn on to indicate that the elevator is stopping at the floor. Additionally, the light may indicate whether the elevator is travelling up or down. Robot 102 may determine whether the particular floor it is travelling to is a higher or lower floor and determine, based on the indicator light, whether the elevator is travelling in the desired direction.

In an embodiment, robot 102 may comprise an array of microphones. Robot 102 may detect, using the array of microphones, sounds indicating that a particular elevator is arriving. For example, robot 102 may determine that an elevator to its right is moving based on detecting the sound of the elevator moving. Additionally, each elevator may generate an audio signal when it is arriving. The elevator may signal once to indicate it is going up or twice to indicate it is going down. Alternately, the elevator may play a message indicating its direction of travel.

In an embodiment, robot 102 uses one or more sensors of the robot to determine whether the elevator door has opened. For example, robot 102 may face an elevator and use a camera to detect whether the door is open. If robot 102 has a plurality of cameras, it may track a plurality of elevators.

Additionally or alternatively, robot 102 may select a particular elevator of the plurality of elevators to track. The selection may be performed randomly or pseudo-randomly. That is, robot 102 may push a button for an elevator, select a particular elevator, and timeout if the door doesn't open and push again.

When the elevator arrives, in an operation 210, the robot enters the elevator. In an embodiment, the robot 102 is programmed or configured to enter the elevator quickly after the elevator door opens, such that it fully enters the elevator before the elevator door closes. In an embodiment, the robot 102 calculates a path from its location to the elevator door while waiting for the elevator to arrive. When the robot 102 detects that the elevator arrived, robot 102 traverses the pre-calculated route to enter the elevator.

After the robot 102 enters the elevator, the robot navigates to an open space and turns to face the elevator door. In an embodiment, the robot navigates to a waiting for elevator pose inside the elevator.

In an operation 212, the robot determines whether anyone is available inside the elevator using one or more sensors of the robot. In an embodiment, robot 102 performs operation 212 while navigating to an open space and turning towards the elevator door. For example, as the robot turns, it may use a camera to determine whether anyone is standing around it.

If a person is available, in an operation 214, the robot requests assistance. In an embodiment, the robot 102 requests assistance by displaying a message on a display of the robot 102, such as a touchscreen or the front of the vertical structure. The message indicates the particular floor the robot is trying to navigate to, and requests the person press the appropriate elevator button. For example, robot 102 may display the message "Please help me get to floor 10."

Additionally or alternatively, the robot 102 requests assistance by causing a sound to be played from one or more speakers of the robot. In an embodiment, the robot 102 plays an alert sound. The sound may notify people near the robot to look at the message displayed by the robot. Additionally or alternatively, the robot 102 plays a message requesting assistance. The message may indicate the particular floor the robot is trying to navigate to. For example, the robot 102 may play the message "Please help me get to floor 10."

If no one is available, in an operation 216, the robot navigates to a button panel and pushes a floor button for the particular floor. In an embodiment, the robot 102 navigates to and aligns itself in front of the button panel. If the button panel comprises a plurality of columns, robot 102 determines the column that includes the button for the particular floor. Additionally or alternatively, robot 102 may position itself a short distance from the wall, such as 2 to 3 centimeters.

In an embodiment, to push the button, the robot 102 rotates until the vertical structure is facing the button panel. Robot 102 causes the vertical structure to move up or down until the pushing element is the height of the desired button. The robot moves towards the button to cause the pushing element to exert an appropriate force on the button, such as the amount of force a human would exert to push the button. Additionally or alternatively, robot 102 may be configured to move a particular distance. For example, if robot 102 is initially positioned 2 centimeters from the wall, it may be configured to move 2 centimeters to push the button.

In an operation 218, the robot waits for the elevator to arrive at the particular floor. In an embodiment, robot 102 navigates to an exit elevator pose. The exit elevator pose may be a defined region that the robot navigates to in order to wait for the elevator door to open. If people are present in the area, the robot may navigate to an open space within or near the region. Additionally or alternatively, the exit elevator pose may be a defined region that the robot navigates to in order to wait for its next action. In an embodiment, the action includes communicating with the elevator to release an elevator door hold to proceed to a next destination. The destination may be determined by the elevator's normal controller operation. Additionally or alternatively, the action may include re-establishing communications to other devices or networks, such as telemetry or video.

In an embodiment, robot 102 uses one or more sensors of the robot to determine whether the elevator door has opened. For example, robot 102 may face an elevator and use a camera to detect whether the door is open. When the elevator door opens, robot 102 uses one or more sensors of the robot to determine whether it is on the correct floor. For example, the robot 102 may use an altimeter or barometer to calculate an estimated floor number. As another example, the robot 102 may use a microphone to detect if the elevator plays an announcement with a floor number or use a camera to identify a number displayed on a floor indicator.

In an operation 220, the robot exits the elevator. In an embodiment, the robot 102 is programmed or configured to exit the elevator quickly after the elevator door opens, such that it fully exits the elevator before the elevator door closes. In an embodiment, the robot 102 calculates a path from its location to the elevator door while waiting for the elevator to arrive at the particular floor. When the robot 102 detects that the elevator reached the particular floor, robot 102 traverses the pre-calculated route to exit the elevator.

In an embodiment, after exiting the elevator, robot 102 verifies that it has arrived at the correct floor. Robot 102 may use one or more sensors of the robot to determine whether it is on the correct floor. For example, the robot 102 may use an altimeter or barometer to calculate an estimated floor number. As another example, the robot 102 may use one or more cameras to detect if a floor number is displayed near the elevator. If robot 102 determines that it is on the incorrect floor, it may repeat process 200 to get to the correct floor.

6. Mobile Kiosk and Telepresence Functions

In an embodiment, the front of the vertical structure may provide a display for telepresence or data functions. The display may include a screen, a camera, a microphone, a speaker, or any combination thereof. Additionally, the display may integrate with other displays and input devices of the robot 102. For example, a screen on the vertical structure may be used to display a graphical user interface (GUI) to communicate messages and that is generated under program control. A touchscreen of the robot may be used to provide input to the GUI to provide instructions or responses to the robot.

In an embodiment, the display on the vertical structure provides a flexibly-sized screen for displaying information. The screen may be larger and more visible than other displays of the robot 102. For example, the vertical structure may be easier to see while the robot 102 is in motion or during elevator button pushing when an occupant is present. The vertical structure may display a request for a passenger to push a button, or provide details of its autonomous actions or plans to occupants while the robot executes the actions or plans. As another example, the vertical structure may be more visible to people who are not be positioned where they can see other displays of the robot, such as patients that are lying in a hospital bed when the robot arrives with deliveries, such as medications.

The screen may be used to display information related to a task the robot is performing, such as a destination of the robot, one or more objects being transported by the robot, the status of the robot or other robots in a fleet.

In an embodiment, the display on the vertical structure may be used to provide mobile kiosk functionality using the robot 102. The screen of the vertical structure may be used to provide information, such as documents, photo, video, menus, and etc. The touchscreen may be used to interact with the information displayed on the vertical structure. For example, a user may select additional information to display, sign or scroll documents, select menu items, and etc.

For example, the robot 102 may be a mobile vending kiosk. One or more storage compartments of the robot 102 may store items. The selection of items may be presented on the vertical structure while the touchscreen may receive a selection from a customer and receive payment information. The robot may then unlock the storage compartment to provide the selected item.

As another example, robot 102 may be a mobile information kiosk. For example, robot 102 may travel to a patient's room in a hospital to provide patient discharge documents, or may roam between airport gates to allow airport travelers to look up flight information, shop for duty-free items, or order food.

In an embodiment, the display on the vertical structure may be used to provide telepresence functionality. The vertical structure may display video received in a video call. Additionally, the vertical structure may include a camera to capture video to transmit for the video call. A touchscreen of the robot may be used to provide controls for the telepresence session.

As an example, a remote hospital provider may use the telepresence functionality of robot 102 to provide prescription instructions to a patient. A local hospital employee may verify that the patient received the instructions and provide input instructing the robot 102 to open a storage compartment and retrieve a prescription for the patient. As another example, the telepresence functionality provides a remote doctor/specialist to aid rural nurse practitioner/general practitioner instructions for using diagnostic instruments or treatments carried by the robot and only accessible by a local medical professional with prior authorization. Additionally or alternatively, the telepresence functionality provides a remote translator to a local physician or nurse to communicate with a patient speaking a different language.

7. Example Robot-Generated Maps

Figure 3:
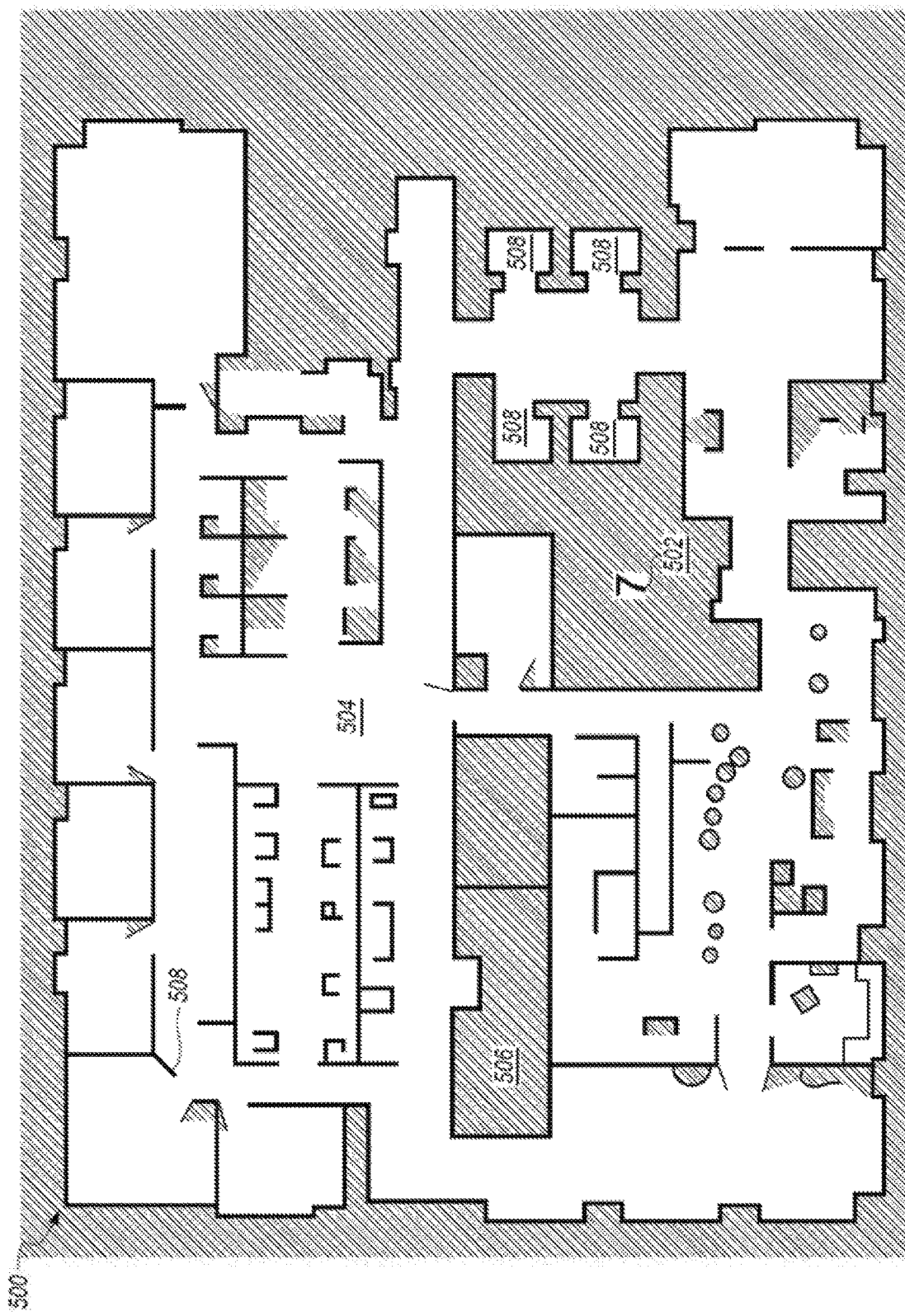
FIG. 3 is an example of a robot-generated map of a floor of a building, according to various embodiments.

FIG. 3 illustrates an example of a robot-generated map. For purposes of illustrating a clear example and not as a limitation, FIG. 3 illustrates a map of a floor of a building.

In an embodiment, map 500 includes an annotation 502 of the floor for which the map was generated. White area 504 is associated with pixels having low cost values and corresponds to spaces that are navigable by the robot including hallway and larger rooms. Gray areas 506 include areas that the robot can navigate, with a higher cost of navigation, and are associated with higher cost values. These areas may include, for example, bathrooms, small rooms or corners, or cluttered areas. Black lines have high or infinite cost values and correspond to interior or exterior walls. Elevators 508 may be used by the robot 102 to navigate between floors.

Additionally or alternatively, a robot-generated map may comprise graph data that defines a plurality of nodes and edges. Each node may represent a location navigable by the robot, such as a hallway or a room. Each edge may represent an ability to move from one location to a connected location. Additionally, each edge may be associated with a cost to move from a location to the connected location. Additionally or alternatively, if the cost of navigation is too high, for example if the rooms are connected by a set of stairs, then the robot-generated map may not include the edge in the graph.

Additionally or alternatively, a robot-generated map may comprise other types of data that describe the environment. For example, the robot-generated map may comprise data associating a plurality of map features with respective location information. Other example maps may include object semantic maps and free space maps. The techniques described herein are not limited to any particular type of robot-generated map.

8. Implementation Example—Computer Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
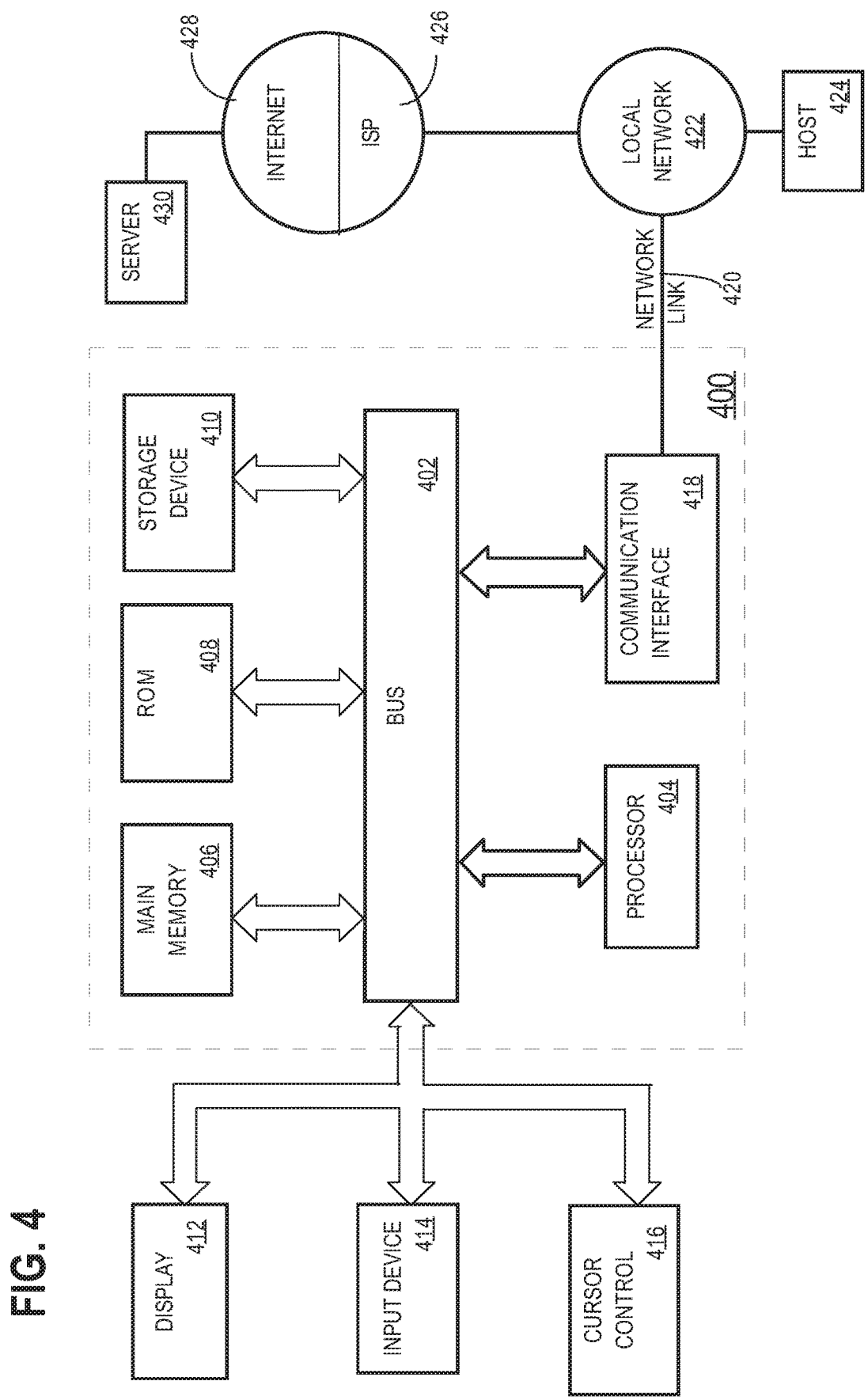
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. Display 412 may also be touch-enabled for communicating gestures, touch interactions, and other user interactions to processor 404.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for a robot to autonomously interact with elevator controls, the robot comprising a vertical structure with a button pushing element, the method comprising:
   while the robot is physically traversing a route to a target location within an environment, determining that the route includes navigating to a particular floor that is different than a current floor of the robot;
   the robot navigating to a set of one or more elevators along the route;
   identifying a location of an elevator call button corresponding to the set of one or more elevators;
   the robot navigating to the location of the elevator call button and pressing the elevator call button by rotating the robot in place until the vertical structure faces the elevator call button, extending or retracting the vertical structure until the button pushing element is aligned with the elevator call button, and moving towards the elevator call button and causing the button pushing element to press the elevator call button.

2. The method of claim 1 wherein identifying a location of the elevator call button comprises determining a height of the elevator call button, and wherein extending or retracting the vertical structure is based on the height of the elevator call button.

3. The method of claim 1 wherein identifying a location of the elevator call button comprises determining a direction of the elevator call button relative to the location of the robot, and wherein rotating the robot in place is based on the direction of the elevator call button.

4. The method of claim 1 wherein the elevator call button is a particular elevator call button of an elevator button panel comprising a plurality of elevator call buttons, and wherein identifying a location of the elevator call button comprises determining a location of the particular elevator call button within the elevator button panel.

5. The method of claim 1 further comprising:
   selecting a particular elevator of the set of one or more elevators;
   calculating a route to the particular elevator;
   detecting arrival of a particular elevator of the set of one or more elevators, and physically traversing the route to enter the particular elevator.

6. The method of claim 5 further comprising determining whether the particular elevator is travelling in a direction of the particular floor and selecting the particular elevator in response to determining that the elevator is travelling in the direction of the particular floor.

7. The method of claim 5 further comprising:
   identifying a location of a floor button corresponding to the particular floor;
   navigation to the location of the floor button corresponding to the particular floor and pressing the floor button corresponding to the particular floor, wherein pressing the floor button comprises:
      rotating the robot in place until the vertical structure faces the floor button;
      extending or retracting the vertical structure until the button pushing element is aligned with the floor button;
      moving towards the elevator call button and causing the button pushing element to press the floor button.

8. The method of claim 7 wherein the floor button is a particular floor button of an elevator button panel comprising a plurality of floor buttons, and wherein identifying a location of the elevator call button comprises determining a location of the particular floor button within the elevator button panel.

9. The method of claim 7 further comprising:
   calculating a route to a door of the particular elevator;
   detecting arrival of the particular elevator at the particular floor, and physically traversing the route to exit the particular elevator.

10. The method of claim 9 wherein detecting arrival of the particular elevator at the particular floor comprises:
    detecting opening of the door of the particular elevator;
    in response to detecting opening of the door of the particular elevator, determining a current floor using one or more sensors of the robot;
    determining whether the current floor is the particular floor.

11. A robot comprising:
    one or more sensors that collect data;
    one or more processors;
    a vertical structure comprising a button pushing element;
    a non-transitory computer-readable storage medium storing instructions which, when executed by the one or more processors, cause performing:
    while the robot is physically traversing a route to a target location within an environment, determining that the route includes navigating to a particular floor that is different than a current floor of the robot;
    the robot navigating to a set of one or more elevators along the route;
    identifying a location of an elevator call button corresponding to the set of one or more elevators;
    the robot navigating to the location of the elevator call button and pressing the elevator call button, wherein pressing the elevator call button comprises:
       rotating in place until the vertical structure faces the elevator call button;
       extending or retracting the vertical structure until the button pushing element is aligned with the elevator call button;
       moving towards the elevator call button and causing the button pushing element to press the elevator call button.

12. The robot of claim 11 wherein identifying a location of the elevator call button comprises determining a height of the elevator call button, and wherein extending or retracting the vertical structure is based on the height of the elevator call button.

13. The robot of claim 11 wherein identifying a location of the elevator call button comprises determining a direction of the elevator call button relative to the location of the robot, and wherein rotating the robot in place is based on the direction of the elevator call button.

14. The robot of claim 11 wherein the elevator call button is a particular elevator call button of an elevator button panel comprising a plurality of elevator call buttons, and wherein identifying a location of the elevator call button comprises determining a location of the particular elevator call button within the elevator button panel.

15. The robot of claim 11 further storing instructions which, when executed by the one or more processors, cause performing:
   selecting a particular elevator of the set of one or more elevators;
   calculating a route to the particular elevator;
   detecting arrival of a particular elevator of the set of one or more elevators, and physically traversing the route to enter the particular elevator.

16. The robot of claim 15 further storing instructions which, when executed by the one or more processors, cause performing determining whether the particular elevator is travelling in a direction of the particular floor, and selecting the particular elevator in response to determining that the elevator is travelling in the direction of the particular floor.

17. The robot of claim 15 further storing instructions which, when executed by the one or more processors, cause performing:
   identifying a location of a floor button corresponding to the particular floor;
   navigation to the location of the floor button corresponding to the particular floor and pressing the floor button corresponding to the particular floor, wherein pressing the floor button comprises:
      rotating the robot in place until the vertical structure faces the floor button;
      extending or retracting the vertical structure until the button pushing element is aligned with the floor button;
      moving towards the elevator call button and causing the button pushing element to press the floor button.

18. The robot of claim 17 wherein the floor button is a particular floor button of an elevator button panel comprising a plurality of floor buttons, and wherein identifying a location of the elevator call button comprises determining a location of the particular floor button within the elevator button panel.

19. The robot of claim 17 further storing instructions which, when executed by the one or more processors, cause performing:
   calculating a route to a door of the particular elevator;
   detecting arrival of the particular elevator at the particular floor, and physically traversing the route to exit the particular elevator.

20. The robot of claim 19 wherein detecting arrival of the particular elevator at the particular floor comprises:
   detecting opening of the door of the particular elevator;
   in response to detecting opening of the door of the particular elevator, determining a current floor using the one or more sensors of the robot;
   determining whether the current floor is the particular floor.

* * * * *